US010273411B2

United States Patent
Shu et al.

(10) Patent No.: US 10,273,411 B2
(45) Date of Patent: Apr. 30, 2019

(54) BATCH-PROCESS SUPERTORREFACTION SYSTEM AND METHOD

(71) Applicants: Academia Sinica, Nankang, Taipei (TW); Frank H. Shu, Solana Beach, CA (US)

(72) Inventors: Frank H. Shu, Solana Beach, CA (US); Fen-Tair Luo, Nankang (TW); Michael J. Cai, San Diego, CA (US)

(73) Assignees: ACADEMIA SINICA, Taipei (TW); Frank H. Shu, Solana Beach, CA (US)

( * ) Notice: Subject to any disclaimer, the term of this patent is extended or adjusted under 35 U.S.C. 154(b) by 0 days.

(21) Appl. No.: 15/309,707

(22) PCT Filed: May 7, 2015

(86) PCT No.: PCT/US2015/029644
§ 371 (c)(1),
(2) Date: Nov. 8, 2016

(87) PCT Pub. No.: WO2015/171865
PCT Pub. Date: Nov. 12, 2015

(65) Prior Publication Data
US 2017/0233658 A1   Aug. 17, 2017

Related U.S. Application Data

(60) Provisional application No. 61/991,017, filed on May 9, 2014.

(51) Int. Cl.
*C10B 49/14* (2006.01)
*C10B 39/06* (2006.01)
(Continued)

(52) U.S. Cl.
CPC .............. *C10B 49/14* (2013.01); *C10B 39/06* (2013.01); *C10B 53/02* (2013.01); *C10B 53/08* (2013.01);
(Continued)

(58) Field of Classification Search
CPC combination set(s) only.
See application file for complete search history.

(56) References Cited

U.S. PATENT DOCUMENTS 3,054,653 A    12/1959  Barton et al.
7,056,422 B2    6/2006  Dell'Orfano
(Continued)

OTHER PUBLICATIONS

International Search Report issued in PCT/US2015/029644, dated Jul. 23, 2015.
(Continued)

*Primary Examiner* — Ellen M McAvoy
*Assistant Examiner* — Chantel L Graham
(74) *Attorney, Agent, or Firm* — Birch, Stewart, Kolasch & Birch, LLP

(57) ABSTRACT

A compact, transportable batch-process supertorrefaction system includes at least one supertorrefying unit, a liquid tank containing molten salt, and a wash tank including a plurality of basins containing water having different temperatures and different salinity. The liquid tank and the wash tank sequentially supply the molten salt and the water to a receiving space of the at least one supertorrefying unit to supertorrefy the biomass into charcoal and to rinse and cool the charcoal, respectively. The plurality of basins of the wash tank sequentially supply water having different temperatures and salinity to the same receiving space to gradually rinse and cool the charcoal. The biomass is not moved (Continued)

in the at least one supertorrfeying unit during biomass supertorrefaction. The charcoal is not moved during charcoal cooling.

17 Claims, 7 Drawing Sheets

(51) Int. Cl.
    *C10L 9/08*          (2006.01)
    *C10B 57/18*       (2006.01)
    *C10L 5/44*          (2006.01)
    *C10B 53/02*       (2006.01)
    *C10B 53/08*       (2006.01)

(52) U.S. Cl.
    CPC ................ *C10B 57/18* (2013.01); *C10L 5/44* (2013.01); *C10L 5/447* (2013.01); *C10L 9/083* (2013.01); *C10L 2290/06* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | |
|---|---|---|---|
| 7,942,942 B2 | 5/2011 | Paoluccio | |
| 2009/0014689 A1* | 1/2009 | Klepper | .................... C01B 3/16 |
| | | | 252/373 |
| 2012/0076716 A1 | 3/2012 | Suchak et al. | |
| 2012/0117815 A1 | 5/2012 | Wechsler et al. | |
| 2013/0139432 A1 | 6/2013 | Shu et al. | |

OTHER PUBLICATIONS

Written Opinion of the International Searching Authority issued in PCT/US2015/029644, dated Jul. 23, 2015.

* cited by examiner

BATCH-PROCESS SUPERTORREFACTION SYSTEM AND METHOD

CROSS-REFERENCE TO RELATED APPLICATION

The present application claims priority to U.S. Provisional Application 61/991,017, filed on May 9, 2014, and titled "Batch-Process Supertorrefaction System and Method," the content of which is incorporated herein by reference in its entirety.

FIELD

The present application relates to systems and methods for producing a combustible fuel from biomass, and more particularly, to torrefaction systems and methods for converting biomass into combustible fuel.

BACKGROUND

The statements in this section merely provide background information related to the present disclosure and may not constitute prior art.

Torrefaction and pyrolysis processes are known to convert biomass into combustible fuel, called "charcoal" or "biocoal". The torrefaction process involves a thermo-chemical treatment of biomass in the absence of oxygen at 200° C. to 280° C. and under atmospheric pressure. The pyrolysis process involves rapid heating of biomass at 700° C. to 1000° C. or above and generally at high pressure. The charcoal generated from the torrefaction process or pyrolysis process may be used in existing coal-fired power plants as regular charcoal (called "ecocoal"), as a soil amendment (called "biochar"), or as a filtration agent (called "activated carbon").

The torrefaction process is more cost-effective due to a relatively low temperature and pressure involved. The charcoal generated by the conventional torrefaction process, however, does not have a desired grindability and moisture content suitable for use in the power plants, which generally use pulverized coal with particle size less than 0.2 mm.

Moreover, conventional torrefaction or pyrolysis processes incur significant costs prior to and after the torrefaction or pydrolysis processes, in addition to the costs for converting biomass into charcoal. For example, the biomass needs to be pre-processed and transported to the torrefaction or pyrolysis facility. Pre-processing the biomass includes chipping or pelletizing the biomass to reduce the size of the raw biomass and pre-heating the biomass to reduce the water content. Additional costs are also incurred in transporting large amount of biomass from the biomass sources to the torrefaction facility/site and transporting the charcoal from the torrefaction facility/site to a commercial destination. In view of the additional costs incurred, the charcoal manufactured from the conventional torrefaction process may not be economically feasible for commercial use.

SUMMARY

The present application provides a compact supertorrefaction system for converting biomass into charcoal. The supertorrefaction system includes discrete units that are closely arranged and can be easily connected and disconnected to form a compact supertorrefaction system. The supertorrefaction system can be easily transported, e.g., by trucks, to remote sites adjacent to biomass sources, thereby reducing the costs associated with transporting the biomass. The supertorrefaction system also provides an energy-efficient process with an increased throughput, thereby reducing the manufacturing costs and making the resulting charcoal economically feasible.

In one form, the supertorrefaction system according to the principles of the present disclosure includes at least one supertorrefying unit, a liquid tank containing a first heat transfer liquid, and a wash tank containing a second heat transfer liquid. The at least one supertorrefying unit includes a container defining a receiving space, and a holding member for holding biomass therein. The holding member is movably received in the receiving space. The liquid tank and the wash tank sequentially supply the first and second heat transfer liquids to the receiving space of the at least one supertorrefying unit to supertorrefy and convert the biomass into charcoal and to rinse and cool the charcoal, respectively. The first heat transfer liquid may be molten salt and the second heat transfer liquid may be water. The holding member may include a meshed basket to allow the first and second heat transfer liquids to flow inside the holding member and to be in direct contact with the biomass and charcoal carried in the meshed basket, respectively. The wash tank includes a plurality of basins containing salty water having different temperatures and salinity to gradually rinse and cool the charcoal. The biomass is not moved in the at least one supertorrfeying unit during biomass supertorrefaction. The charcoal is not moved in the at least one supertorrefying unit during charcoal cooling and cleaning.

In another form, a method of batch-processing biomass into charcoal is provided. The method includes: providing biomass in a receiving space of at least one supertorrefying unit; supplying a first heat transfer liquid to the supertorrefying unit to supertorrefy and convert the biomass into charcoal; and supplying a second heat transfer liquid to the at least one supertorrefying unit to cool and rinse the charcoal. The biomass is preheated and supertorrefied into charcoal in the receiving space of the supertorrefying unit. The charcoal is cooled in the same receiving space of the supertorrefying unit by the second heat transfer liquid. The biomass and charcoal are not moved in the supertorrefying unit when the biomass is converted into the charcoal and when the charcoal is rinsed and cooled. The method may further include changing operating temperature, residence time, or pretreatment impregnation of the biomass to generate different types of charcoal, such as ecocoal, biochar, or activated carbon.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
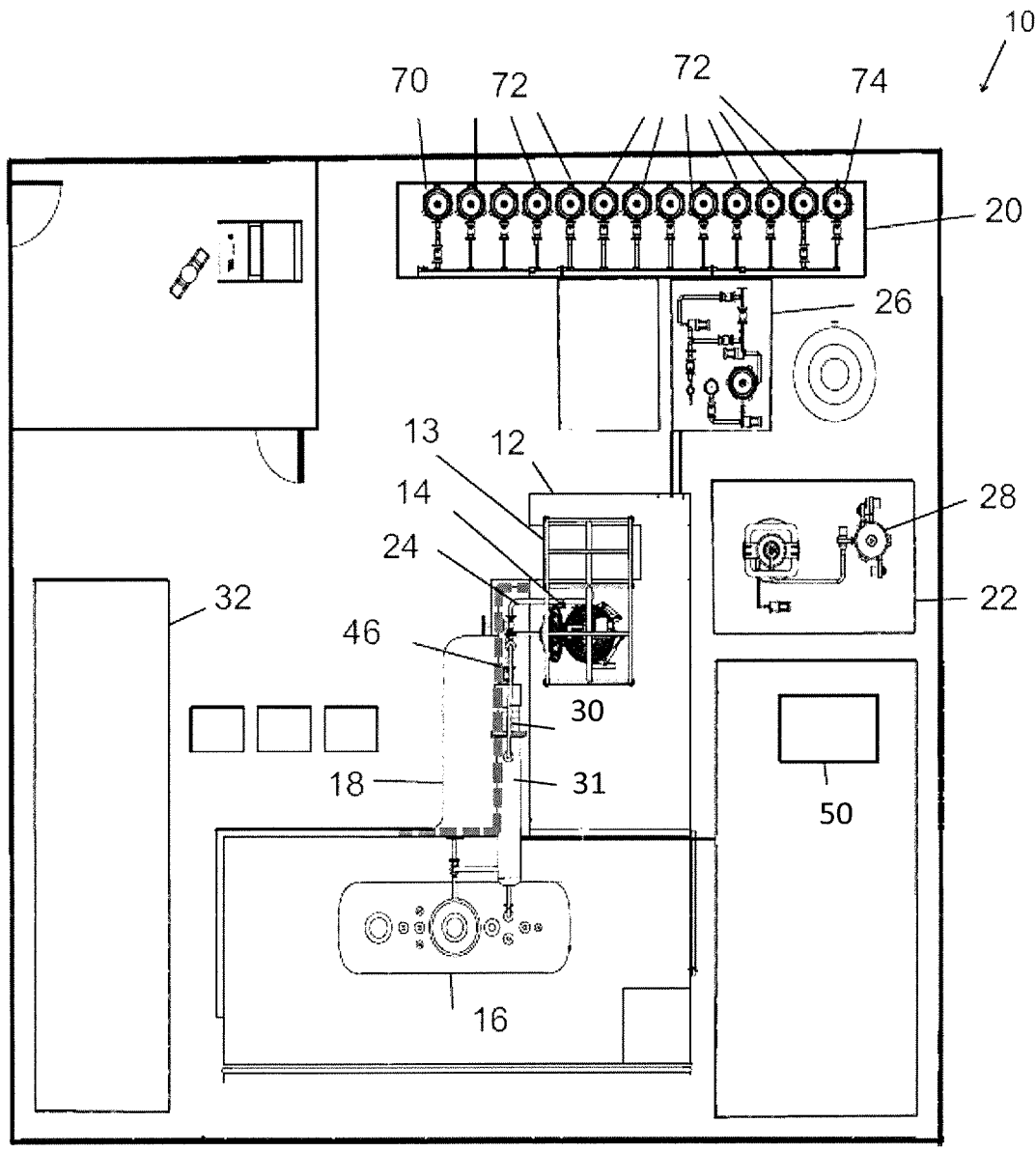
FIG. 1 is a schematic view of a supertorrefaction system in accordance with the principles of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a supertorrefaction system 10 according to the teachings of the present disclosure generally includes a transporting apparatus 12, at least one supertorrefying unit 14 for torrefying biomass into charcoal, a liquid tank 16, a heating unit 18, and a wash tank 20. The liquid tank 16 contains a first heat transfer liquid, such as molten salt, and supplies the first heat transfer liquid to the supertorrefying unit 14. The heating unit 18 may be disposed adjacent to the liquid tank 16 to heat the first heat transfer liquid. The wash tank 20 supplies a second heat transfer liquid, such as water or salty water, to the supertorrefying unit 14 for cooling and cleaning the charcoal that has been converted from the biomass. While only one supertorrefying unit 14 is shown in FIG. 1, it is understood that more than one supertorrefying unit 14 may be provided to be in fluid communication with the liquid tank 16 and the wash tank 20 for supertorrefying multiple batches of the biomass at the same time.

Optionally, the supertorrefaction system 10 may include a volatile organic compounds (VOC) unit 22 for collecting volatile organic compounds (VOC) released from the supertorrefying unit 14, a first filtration apparatus 24 disposed between the supertorrefying unit 14 and the liquid tank 16, a second filtration apparatus 26 disposed between the wash tank 20 and the supertorrefying unit 14, and a charcoal fines/tar oxidizer ("CF/tar oxidizer") 50. The VOC unit 22 may further include a scrubber 28.

A biomass preparation area 32 may be provided in or adjacent to the supertorrefaction system 10. Biomass is collected and stored in the biomass preparation area 32 to be transported, by the transporting apparatus 12, to the supertorrefying unit 14 for torrefaction. The biomass may be in the form of chips or pellets, and may include, but be not limited to, sugar-cane bagasse, corn stover, rice straw, wheat straw, bamboo, wood chips, forest residue, yard trimmings, fruit peels, palm kernel shell, coconut shell, and switchgrass.

The heating unit 18 may be disposed to heat the supply pipe 30 and thus heat the first heat transfer liquid to a predetermined temperature as the first heat transfer liquid is supplied from the liquid tank 16 through a supply pipe 30 to the supertorrefying unit 14. The first heat transfer liquid contained in the liquid tank 16 may be a water-soluble molten salt. However, other types of liquids may be used as the heat transfer liquid.

Figure 2:
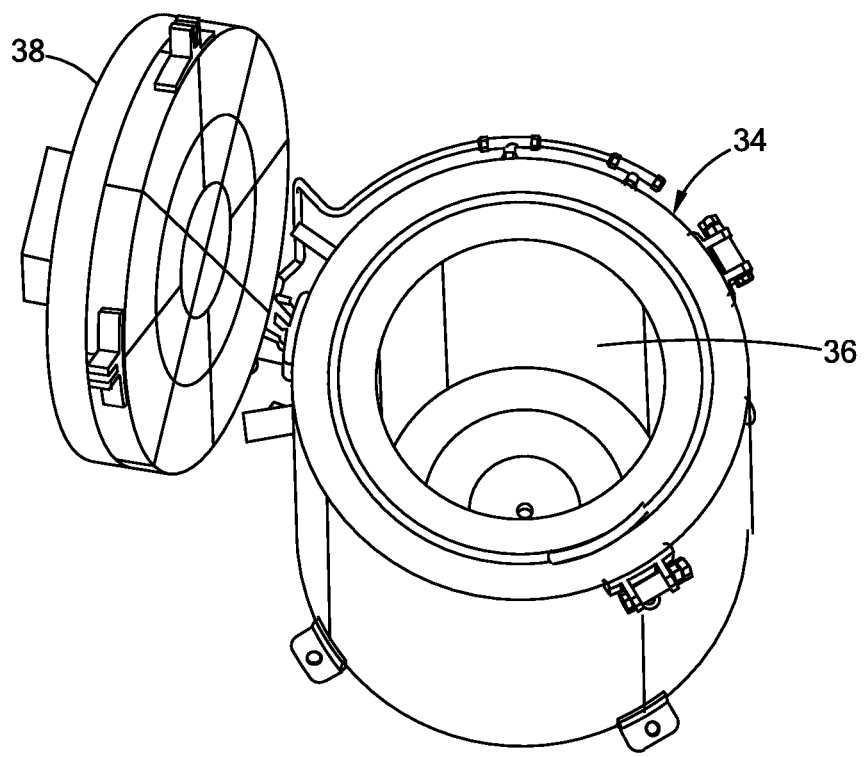
FIG. 2 is a perspective view of a supertorrefying unit of the supertorrefaction system of FIG. 1 in accordance with the principles of the present disclosure, wherein a holding member is removed for clarity.
Figure 3:
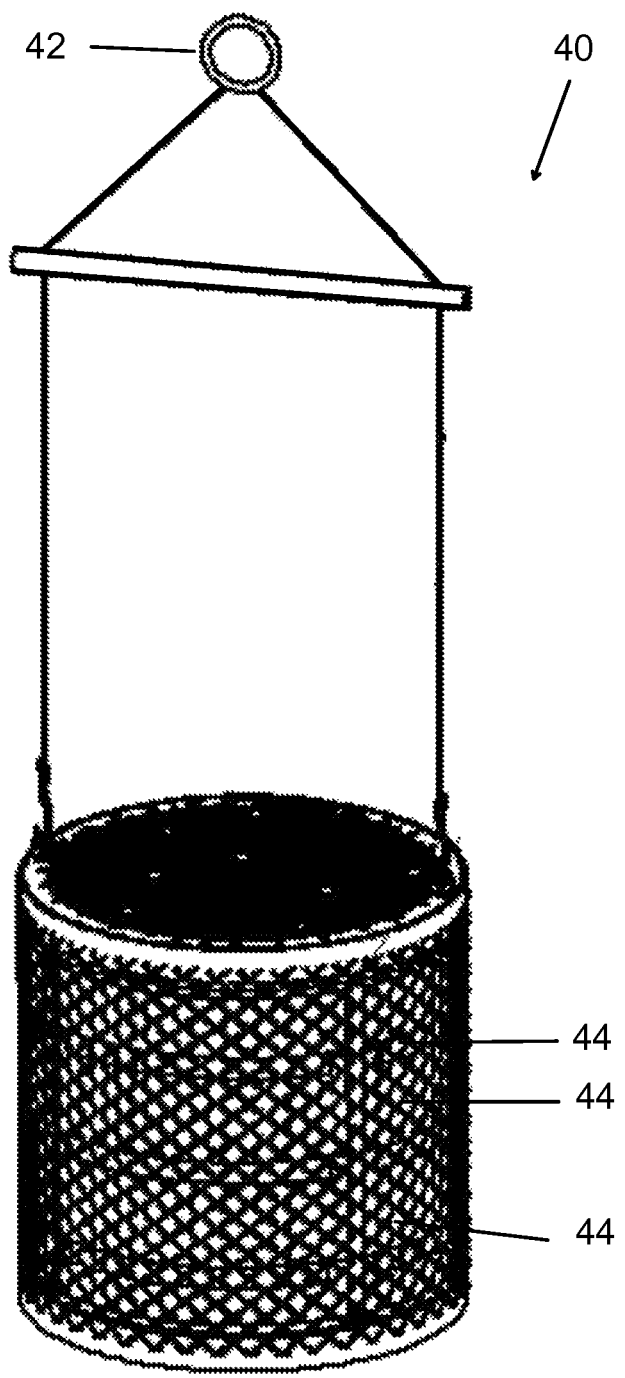
FIG. 3 is a perspective view of a holding member of the supertorrefying unit of FIG. 2.

Referring to FIGS. 2 and 3, the supertorrefying unit 14 includes a container 34 defining a receiving space 36, a lid 38 for closing the container 14, and a holding member 40 (shown in FIG. 3) movably received in the receiving space 36. The holding member 40 includes a machine-graspable handle 42 to allow the transporting apparatus 12 to lower and lift the holding member 40 in and out of the receiving space 36 of the supertorrefying unit 14. The first heat transfer fluid, such as molten salt, and the second heat transfer fluid, such as water, may be sequentially supplied from the liquid tank 16 and the wash tank 20, respectively, into the same receiving space 36 of the supertorrefying unit 14 to supertorrefy and convert the biomass into charcoal, and cool and rinse the charcoal. The biomass may also be preheated in the supertorrefying unit 14 by using the first heat transfer fluid, or a different heat transfer fluid prior to supertorrefaction of the biomass into the charcoal.

As shown in the FIG. 3, the holding member 40 defines a plurality of holes 44 through which the first and second heat transfer fluids may flow into the holding member 40 to be in direct contact with the biomass or the biocoal contained therein. As an example, the holding member 40 may be in the form of a meshed basket or any other form as long as the holding member 40 can hold the biomass or the resulting charcoal and allow the first and second heat transfer fluids to be in direct contact with the biomass or the charcoal. The holding member 40 can be transported from the biomass preparation area 32 to the receiving space 36 of the supertorrefying unit 14 to move the biomass for the supertorrefying process. After the biomass is converted into charcoal, the holding member 40 is lifted out of the receiving space 36 of the supertorrefying unit 14 to move the charcoal to a charcoal collection area (not shown). The holding member 40 is then transported from the charcoal collection area to the biomass preparation area 32 for the next batch-processing and supertorrefaction cycle.

After the holding member 40 carrying the biomass is lowered into the receiving space 36 of the supertorrefying unit 14, the first heat transfer fluid having a first temperature is supplied to the supertorrefying unit 14 through the supply pipe 30. The heating unit 18 first heats the molten salt as the first heat transfer fluid to a first temperature to preheat the biomass. Thereafter, the molten salt at the first temperature is pumped out of the supertorrefying unit 14. The heating unit 18 then heats the molten salt to a second temperature higher than the first temperature, as the molten salt is supplied through the supply pipe 30 to the supertorrefying unit 14. The molten salt at the second temperature supertorrefies the biomass into charcoal. The first temperature for preheating the biomass may be in the range of 100° C. and 200° C. The second temperature for torrefying the biomass into charcoal may be in the range of 300° C. to 500° C. depending on a desired type of the charcoal, such as ecocoal, biochar, or activated carbon, to be produced. The residence time of the biomass immersed in the supertorrefying unit 14 and the pretreatment impregation of the biomass are also controlled depending on the types of charcoal to be generated.

After preheating the biomass and supertorrefaction of the biomass into charcoal, the molten salt is circulated back to the liquid tank 16 through a return pipe 31. Due to the meshed structure of the holding member 40 and the lifting and lowering motion of the holding member 40, charcoal fines (CF) that have been converted from the biomass may fall outside the holding member 40 and taint the molten salt in the supertorrefying unit 14. To prevent charcoal fines of large size (e.g., 10 microns) from being circulated to the liquid tank 16, the first filtration apparatus 24 may be disposed at the return pipe 31 and between the liquid tank 16 and the supertorrefying unit 14. The CF particles smaller than the predetermined size may be carried by the molten salt to the liquid tank 16 and circulated back to the supertorrefying unit 14 in the next supertorrefaction cycle.

The transporting apparatus 12 may include a hoist system 13 for lowering and lifting the holding member 40 into/out of the supertorrefying unit 14, and transporting the holding member 40 from/to the biomass preparation area 32, the supertorrefying unit 14, and the charcoal collection area.

Figure 4:
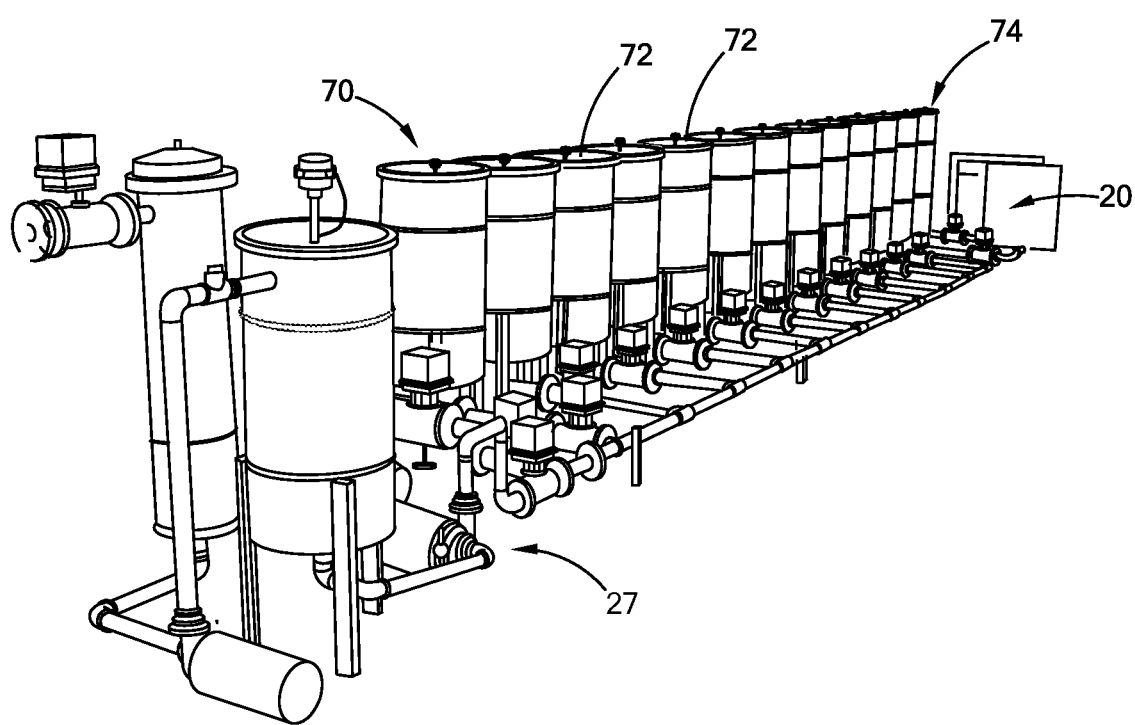
FIG. 4 is a schematic view of a wash tank of the supertorrefaction system of the present application.

Referring to FIG. 4, the wash tank 20 includes a plurality of basins 70, 72, 74 and a pumping apparatus 27 disposed between and in fluid communication with the plurality of basins 70, 72, 74 and the supertorrefying unit 14. The plurality of basins 70, 72, 74 contain wash liquid having different degrees of salinity and temperatures. For example, the first basin 70 contains water having the highest temperature and highest degree of salinity among the plurality of basins 70, 72, 74. The last basin 74 contains water having the lowest temperature and lowest degree of salinity. Basins 72 disposed between the first and last basins 70, 74 have a temperature and salinity between those in the first and last basins 70 and 74. While twelve basins are shown in the wash tank 20, it is understood that any number of basins may be used depending on application.

After the biomass is supertorrefied and converted into charcoal in the supertorrefying unit 14, the molten salt is pumped out of the supertorrefying unit 14 and returned to the liquid tank 16. Molten salt remain in pores of the charcoal. The water in the plurality of basins 70, 72, 74 are then sequentially pumped into the supertorrefying unit 14 to dissolve the salt that remains in the pores of the charcoal. The plurality of basins 70, 72, 74 sequentially supply salty water having different salinity and different temperatures, in that order, to the supertorrefying unit 14. The first basin 70, which contains water of the highest temperature and highest degree of salinity, supplies water into the receiving space 36 of the supertorrefying unit 14 first to wash and clean the charcoal, while providing cooling to the charcoal. Next, the water having the highest temperature and highest degree of salinity is pumped out of the receiving space 36 of the supertorrefying unit 14 and circulated back to the first basin 70. Thereafter, the second basin 72 supplies water having the second highest temperature and the second highest degree of salinity to the receiving space 36 of the supertorrefying unit 14 to further wash, rinse, clean and cool the charcoal. The same process repeats for the other basins 72 until the last basin 74 that contains the lowest temperature and the lowest degree of salinity supplies water into the receiving space 36 of the supertorrefying unit 14. By using the plurality of basins 70, 72, 74 to sequentially supply water of different temperatures and salinity into the supertorrefying unit 14 and by sequentially pumping the wash water out of the supertorrefying unit 14 back to the plurality of basins 70, 72, 74, the charcoal is gradually cooled to near ambient temperature in a stepwise fashion and cleaned in the supertorrefying unit 14.

When the wash process by the wash tank 20 is completed, the charcoal in the supertorrefying unit 14 is free of salt and can be moved out of the supertorrefying unit 14. The charcoal can be burned as ecocoal, or buried in soil as biochar, or employed for filtration as activated carbon. When the charcoal contains residues of furfural and acetol, the charcoal can have increased heating value. In wet biochar, furfural and acetol will break down in soil if the biochar is locally buried or distributed, with the near-permanent sequestration of its fixed carbon. For high-value activated carbon obtained by pre-treating the biomass with a strong base or acid, post-production heating can drive out any trapped furfural and acetol.

Because furfural and acetol are gradually filtered from the aqueous salt solution during each washing step by the basins 70, 72, 74, the amounts of furfural and acetol that is released from the charcoal to water in the last basin 74 becomes relatively small. Any furfural or acetol remaining in the water to be supplied to the supertorrefying unit 14 for the next batch processing/supertorrefaction of biomass can be directed into the VOC stream and/or undergoes another round of charcoal filtration.

After the holding member 40 is emptied at the charcoal collection area, the holding member 40 can be moved by the transporting apparatus 12 to the biomass preparation area 32 to carry another fresh batch of raw biomass for next batch processing/supertorrefaction in the supertorrefying unit 14. When the lid 38 is closed, the wash liquid from the first basin 70 may be pumped into the supertorrefying unit 14. This wash liquid has temperature close to the boiling point of a saturated salt solution due to the previous batch processing when the water is supplied to the hot charcoal permeated with molten salt. The boiling hot salty water can dehydrate the biomass. Therefore, molten salt at a temperature of 300° C. to 500° C. may be supplied from the liquid tank 16 to the supertorrefying unit 14 to further dehydrate the biomass. The supply of the molten salt into the aqueous solution in the supertorrefying unit 14 causes the water in the torreyfying unit 14 to evaporate. As a result, the salt that is carried to the first basin 70 in the previous batch processing can be recovered. The temperature of the mixture is continuously increased up to between 300° C. and 500° C., to start the supertorrefying cycle.

The chopped raw biomass is contained in the holding member 40 in the form of a meshed basket. The charcoal will mostly stay inside the holding member 40 and be recoverable as charcoal pieces ("CP"). However, mechanical handling and thermo-chemical processing may create charcoal fines ("CF") that escape out of the holding member 40 into the molten salt contained in the supertorrefying unit 14. Therefore, the first filtration apparatus 24 is provided between the liquid tank 16 and the supertorrefying unit 14 to prevent the CF particles larger than 10 micron from being circulated to the liquid tank 16.

In addition, a second filtration apparatus 26 may be provided between the supertorrefying unit 14 and the first basin 70 that contains water having the highest temperature and highest degree of salinity. The second filtration apparatus (not shown) prevents CF from entering the wash tank 20. Similarly, the second filtration apparatus removes CF particles larger than the pore size of the filter (10 micron) and smaller than the mesh size of the basket screen (800 micron or less) from entering the wash tank 20, particularly the first basin 70. By routing the wash liquids from the first basin 70 to the last basin 74 through the second filtration apparatus before the liquids enter the supertorrefying unit 14, the CF particles can be separated from the water flowing to the wash tank 20. The filter can be regularly removed and blown off by warm air (e.g., flue gas mixed with normal air) to remove CF from the filter. The dried CF removed from the filter may be optionally pulverized into powders and can be blown into the CF/tar oxidizer 50 for further processing, which will be described in more detail below.

The smaller CF particles may continue to be accumulated in the liquid tank 16 and continue to increase viscosity of the molten salt. When a significant amount of small CF has been accumulated in the liquid tank 16 to prevent the molten salt from being effectively pumped out to the supertorrefying unit 14, the CF/tar oxidizer 50 may be used to remove the small CF from the liquid tank 16.

Figures 5, 6:
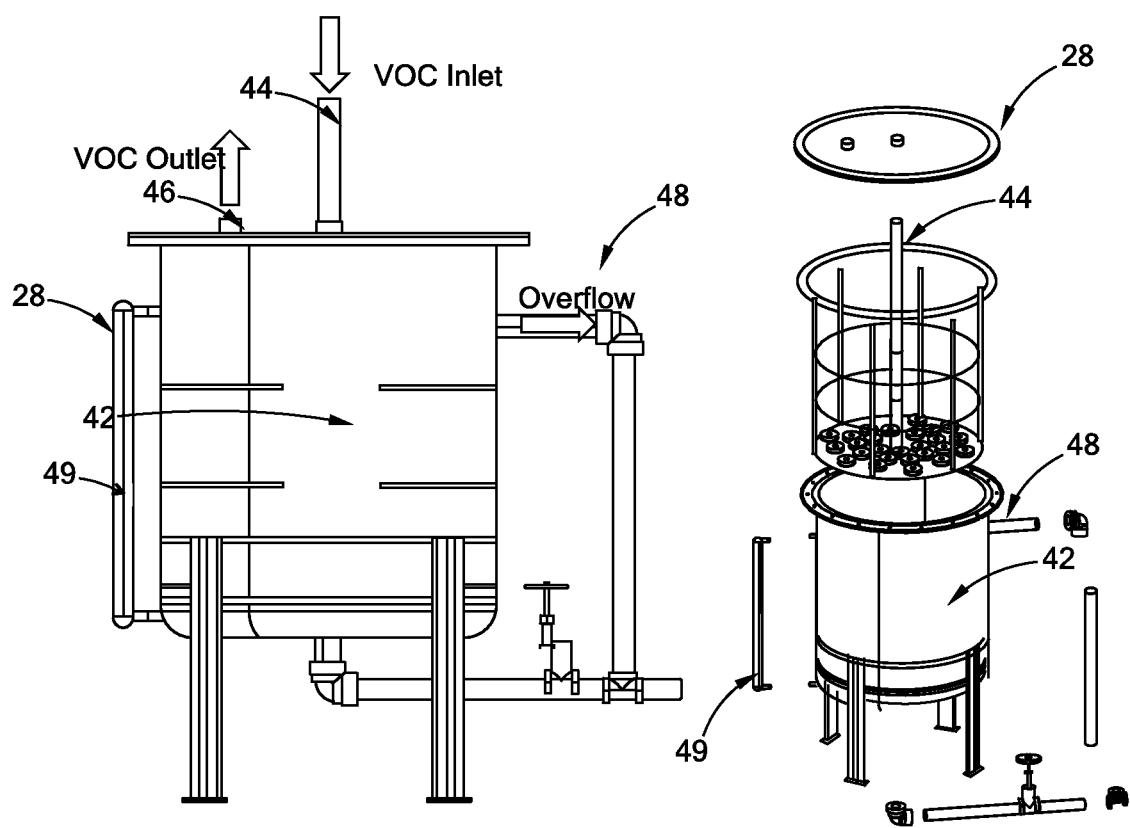
FIG. 5 is a side view of a scrubber of the supertorrefaction system of the present application.
FIG. 6 is a partial exploded perspective view of the scrubber of FIG. 5.

Referring to FIGS. 5 and 6, the supertorrefaction system 10 may optionally include a scrubber 28 in communication with the VOC unit 22 (shown in FIG. 1). The VOC unit 22 includes pipelines (not shown) in fluid communication with the supertorrefying unit 14 to collect volatile organic compounds (VOC) released during the supertorrefying process in the supertorrefying unit 14. The scrubber 28 is provided in fluid communication with the VOC unit 22 to further treat the VOC to remove harmful objects, such as acids from the VOC.

More specifically, the scrubber 28 generally includes a hollow cylindrical body 42, an inlet 44, an outlet 46, an overflow pipe 48, and a level sensor 49. The mixture of steam and volatiles received in the VOC unit 22 is directed through the inlet 44 into the hollow cylindrical body 42 of the scrubber 28. The hollow cylindrical body 42 contains liquids including, but not limited to, molten alkali carbonate salt, aqueous alkali hydroxides, aqueous solutions of alkali carbonates. The VOCs, being a mixture of steam and volatiles, is directed to the hollow cylindrical body 42 and can chemically react with the liquids, such as alkali carbonate salt, contained in the scrubber 28. As a result, the alkali carbonate salt contained in the scrubber 28 removes organic acids, such as acetic acid from the VOC stream, while condensing some of the water, furfural, and acetol. The chemical reaction occurring in the scrubber 28 generates off-gas, which is vented out of the scrubber 28 through the outlet 46 to the condenser (not shown) of the VOC unit 22 for further treatment. In the condenser, the off-gas is condensed and separated into syngas and bioliquour containing mostly water and methanol. The bioliquour may also contain a bit of furfural and acetol.

The syngas from the VOC unit 22 may be collected and used as a chemical feedstock or may be burnt on site to generate flue gases, which can provide supplemental heating to the supertorrefaction process. To burn the syngas, the supertorrefaction system 10 may be optionally provided with a burning unit (not shown) that can burn tars, charcoal fines, or pulverized charcoal using the syngas without emitting noxious fumes or particulates to the atmosphere. The hot flue gas generated from burning of the syngas can be recycled to provide supplemental heating to the molten salt in the liquid tank 16, for example, by using the CF/tar oxidizer 50.

Figure 7:
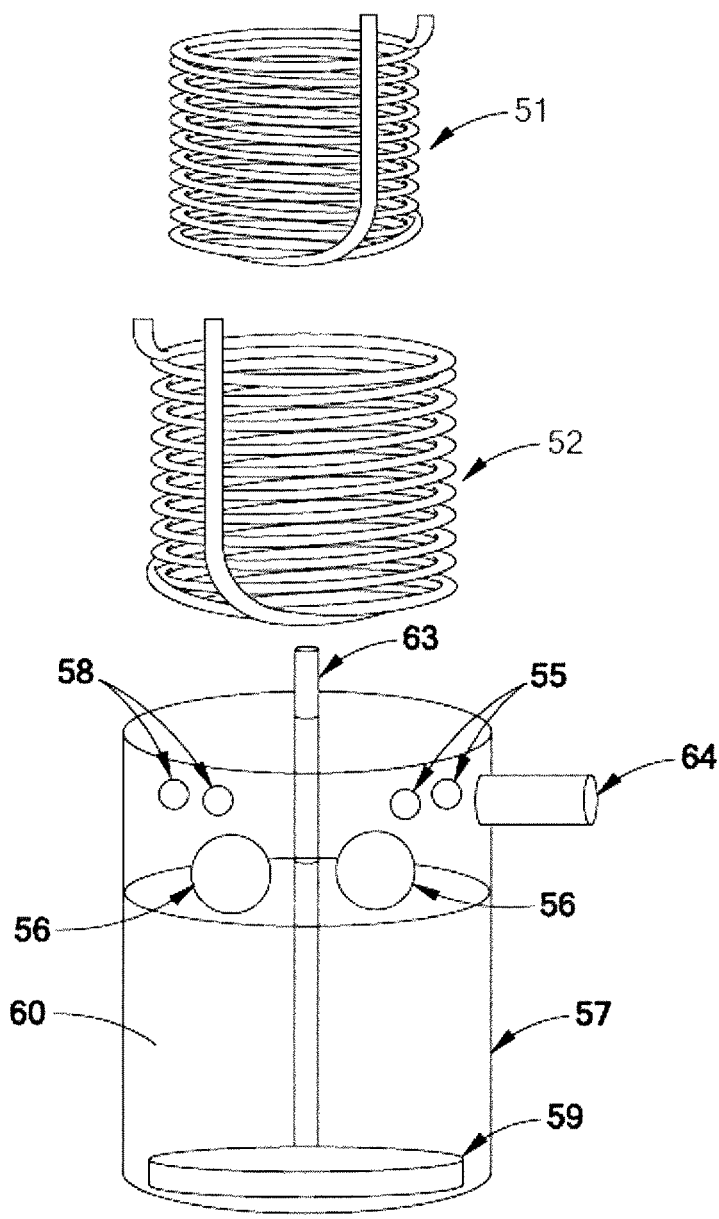
FIG. 7 is a schematic view of a CF/tar oxidizer of the supertorrefaction system of the present application.

Referring to FIG. 7, a CF/tar oxidizer 50 may optionally be provided in the supertorrefaction system 10 for treating the molten salt tainted by the CF particles, while using the heat released in the CF/tar oxidizer 50 as supplement heating to the molten salt to be supplied to the supertorrefying unit 14 and the scrubber 28. As previously noted, the first filtration apparatus 24 only filters larger CF particles, the smaller CF particles remain in the molten salt and are carried by the molten salt back to the liquid tank 16. The smaller CF particles are gradually accumulated in the liquid tank 16 and increase the viscosity of the molten salt. The CF/tar oxidizer 50 may be provided to be in fluid communication with the return pipe 31 to remove the small CF particles from the molten salt on a regular basis.

The CF/tar oxidizer 50 includes a canister 57 defining a chamber, a sparging pipe 63 disposed in the chamber of the canister 57, a porous sparging body 59 disposed at a lower end of the sparging pipe 63, a first coiled pipe 51 and a second coiled pipe 52 disposed in the chamber. The porous sparging body 59 defines a plurality of sparging outputs in fluid communication with the sparging pipe 63. A mixture of flue gas and air is supplied to the chamber of the canister 57 through an upper end of the sparging pipe 63.

The canister 57 defines a plurality of inlet ports 56 through which molten carbonate/nitrate salt tainted by CF particles or tart (i.e., tainted salt 60) may be supplied to the chamber of the canister 57, and a first set of mounting holes 55 for mounting the first coiled pipe 51 to the canister 57 and a second set of mounting holes 58 for mounting the second coiled pipe 52 to the canister 57. The first coiled pipe 51 is smaller than the second coiled pipe 52 so that the first coiled pipe 51 and the second coiled pipe 52 may be coaxially arranged in the canister 57. The first coiled pipe 51 includes a cold leg (i.e., an inlet) and a hot leg (i.e., an outlet) to be inserted in the first set of mounting holes 55. The second coiled pipe 52 includes a cold leg (i.e., an inlet) and a hot leg (i.e., an outlet) inserted in the second set of mounting holes 58. The first and second coiled pipes 51 and 52 carry the molten carbonate salt used in the scrubber 28 and the molten salt used in the supertorrefying unit 14, respectively. The canister 57 contains the tainted salt 60. A mixture of hot flue gas and air is sparged into the tained salt 60 in the canister 57 through the sparging pipe 63 and the outlets of the porous body 59 at the bottom of the canister 57. The hot flue gas may be obtained by burning syngas, which is generated at the VOC unit 22.

Nitrate salts may be optionally added in the canister 57 as a catalyst to enable oxidation of the CF particles contained in the tained salt 60. As the mixture of hot flue gas and air is sparged in the tainted salt 60 through the sparging pipe 63 and the porous body 59, the CF particles contained in the tainted salt 60 is oxidized to release heat. The heat is applied to the first and second coiled pipes 51 and 52 which are in fluid communication with the liquid tank 16 and the scrubber 28 to heat the molten salt and the molten carbonate salt contained therein. The heat released during oxidization of the CF provides additional heating to the molten salt to be supplied to the supertorrefying unit 14, and to the carbonate salt used in the scrubber 28, thereby eliminating the need for external supply of fossil fuels to supply the heat for supertorrefaction and for salt recovery.

More specifically, as the mixture of the flue gas and air is injected into the tainted salt 60 contained in the canister 57, the bubbles of flue gas rise through the tainted salt 60 and heat from the flue gas is transferred to the surrounding liquid. The small amount of oxygen contained in the mixture of flue gas and air helps convert any nitrite ions $NO_2^-$ in the canister 57 into nitrate ions $NO_3^-$ as well as reacts with carbonate ions $CO_3^=$ to create peroxide ions $O_2^=$ and carbon dioxide $CO_2$. In turn, the nitrate ions $NO_3^-$ react with peroxide $O_2^=$ to produce nitrite ions $NO_2^-$ and superoxide ions $O_2^-$. It is the superoxide ions $O_2^-$ that attack the carbon in CF to produce $CO_3^=$ and carbon monoxide CO at a much faster rate than the sparged $O_2$ gas can directly burn the carbon in CF into $CO_2$. The product CO can be exothermically oxidized to become $CO_2$. The net result is to turn the carbon C in CF and to turn the sparged oxygen $O_2$ into $CO_2$, with the molten carbonate and nitrate salts acting as catalysts to facilitate the net result. This is why the process is referred to as "oxidation" rather than "combustion."

Branching pathways can lead to the destruction of some nitrate/nitrite into $NO/NO_2$ gas, but sparging at a proper rate and keeping the tainted salt 60 at a relatively low operating temperature can control the release of such noxious gases. The off-gas from a well-operated CF/tar oxidizer should be composed almost exclusively of $CO_2$ and $H_2O$ (from reactions involving the hydrogen and oxygen content in CF), but to ensure the complete oxidation of combustibles, it may be wise to subject the vented gases to an additional burn, with the hot flue gas from this burning used for other facility purposes, such as helping to pre-dry cold biomass or post-dry wet CP.

An ideally operated CF/tar oxidizer 50 will keep the carbonate and nitrate ions in their original proportions. The flue gas provides sufficient $CO_2$ to convert any alkali oxides produced by reaction with the excess air into alkali carbonates. CO that is not combusted into $CO_2$ in the oxidizer 50 can convert $NO_3^-/NO_2^-$ ions into $NO/NO_2$ gas plus $CO_3^=$ ions. If this happens, the alkali nitrates can be restored by adding in the correct molar amount of relatively inexpensive nitric acid $HNO_3$ and converting some of the alkali carbonates to alkali nitrates plus steam and carbon dioxide that escape through the off-gas port 64.

For the complementary purpose of oxidizing tars and powdered charcoal fines (and/or pulverized charcoal pieces if we wish to use the CF/tar oxidizer 50 to create more heat for the supertorrefying unit 14 so that we can dispense with external sources of fuel for the operation of the facility), we can choose among combinations of molten alkali hydroxides composed of LiOH, NaOH, KOH and molten alkali carbonates composed of $Li_2CO_3$, $Na_2CO_3$, $K_2CO_3$. Lower corrosivity against common stainless steels and superalloys leads us to prefer carbonates to hydroxides as the oxidizer salt, but the use of the general method is not limited to the specific examples of the disclosure. Adding nitric acid $HNO_3$ to the $Li_2CO_3$, $Na_2CO_3$, $K_2CO_3$ then makes the corresponding amounts of $LiNO_3$, $NaNO_3$, $KNO_3$, together with the release of $CO_2$ and $H_2O$ vapor. Laboratory experiments suggest that nitrate/carbonate salt weight-ratios between 1/9 and 1/4 yield acceptable rates of oxidation of powdered CF.

In the CF/tart oxidizer 50, the tainted salt 60 prevents the formation of fly ash, and the tainted salt 60 can also capture the fly ash resulting from poor combustion in the syngas burner. Therefore, an additional baghouse to capture fly ash is not required, which is a significant advantage compared to the alternative of burning the CF in air. Furthermore, the heat released by the oxidation of CF/tar is absorbed completely by the molten salt, so the heat transfer efficiency is appreciably higher than traditional methods that might burn the charcoal outside the vessel holding the molten salt. What would be bottom ash in a traditional burner, from the small amounts of calcium and magnesium that exist in all vegetation, are precipitates of $Mg_2O$ and $CaCO_3$ in the molten salt of the CF/tar oxidizer. Mechanical methods can remove these precipitates, resulting in expectations of a long service lifetime for the oxidizer salt.

If the scrubber salt is a molten combination of alkali carbonates and alkali acetates at, for example, 450° C., some of the acetates will decompose into carbonates, releasing acetone in the process. If the acetone vapor in the outlet hot leg of the spiral coil is separated from the liquid salt, the resulting acetone is relatively pure and can be sold on the commodities market. The liquid salt continues back to the scrubber 28. In a well-run operation, the amount of acetate salt per batch converted into carbonate salt in the small spiral coil will be recovered by the reaction of the carbonate salt in the scrubber with the acetic acid released in the VOCs from the supertorrefying unit 14 of the next batch. If we ignore heat losses from insulated metallic surfaces, the scrubber temperature will acquire an equilibrium (arbitrarily taken to be 450° C. in the example above) dictated by the balance of cooling by the VOC bubbles from supertorrefaction at 300° C. to 400° C. and of heating across the small spiral coil by the molten oxidizer salt kept at 500° C.

If the supertorrefaction salt (i.e., the salt used in supertorrefaction in the supertorrefying unit 14) is alkali acetate, apart from heat losses from insulated metal surfaces, the supertorrefaction salt will reach a mean temperature governed by a balance of the heat transferred by direct contact with the biomass and the liquid in the cooker and the heat transferred across the metal walls of the large spiral coil from the oxidizers alt at 500° C. and the supertorrefaction salt. We can control the mean temperature of the supertorrefaction salt to be 300° C. or 400° C. by varying how much biomass (and associated wash liquid) we put into the cooker at the outset of the supertorrefaction process and how much pulverized CP we choose to add to the CF powder in the CF/tar oxidizer 50. The pump rate of the supertorrefaction salt affects the temperature difference between the hot and cold legs of the supertorrefaction salt flowing between the cooker and the CF/tar oxidizer 50. It is recommended that the pump capacity is controlled to keep this difference to be no greater than 10° C. in order to produce ecocoal or biochar of a highly uniform quality.

Because only heat is being transferred across the first and second coiled pipes 51 and 52, the two different types of salts contained in the first and second coiled pipes 51 and 52 are not mixed. Thus, the chemical characters of the two salts are preserved: for example, alkali carbonate/nitrate for the oxidizer salt and alkali acetate for the supertorrefaction salt. Any thermal decomposition of the acetate ions into carbonate ions in the supertorrefaction salt results in the release of acetone that mixes with the VOCs released in the cooker and is ultimately burned along with the syngas component of the VOCs. The carbonate ions will in turn react with the released acetic acid HOAc in the VOCs, yielding an equilibrium ratio of carbonate/acetate for the supertorrefaction salt dictated by the balance of acetate destruction by thermal decomposition and acetate formation by reaction of carbonate with acetic acid. At 300° C. to 400° C., the rate of thermal decomposition of acetates is small (especially if we do not include LiOAc as an optional component of the supertorrefaction salt), so the amount of acetic acid neutralized in the scrubber is not much depleted by the wasteful release of acetone in the cooker rather than in the small spiral coil leading to the scrubber.

To make the above set of procedures work in practice, the chemical composition of alkali acetate, alkali carbonate, and alkali nitrate salts must be chosen appropriately. If the filtration apparatus prevents even CF particles smaller than 10 micron from accumulating, for the supertorrefaction salt, we recommend eutectic binary acetate, NaOAc/KOAc, in the molar proportions 45/55 (with a melting point of 235° C.). For the scrubber and tar burner salt, we recommend a ternary carbonate, $Li_2CO_3/Na_2CO_3/K_2CO_3$, in the eutectic molar proportion 42.5/32.6/26.9 (with a melting point of 393° C.). As the catalyst for oxidation of CF, we recommend a ternary nitrate, $LiNO_3/NaNO_3/KNO_3$, also in the molar proportion 42.5/32.6/26.9 (with a melting point well below that of the $Li_2CO_3/Na_2CO_3/K_2CO_3$), which will automatically result if we simply add nitric acid $HNO_3$ to the eutectic ternary carbonate.

The relatively expensive lithium salts then flow in closed loops that preserve the number of lithium cations. Losses of nitrate anions can occur in the oxidizer salt. The nitrates can be replenished by adding sufficient nitric acid $HNO_3$, which is a relatively cheap commodity.

If CF particles smaller than 10 micron steadily accumulate in the supertorrefaction salt, we recommend switching to a supertorrefaction salt comprised of a non-eutectic binary NaOAc/KOAc in the molar proportion of 30.6/26.9, which has a melting point below 300° C. The small CF particles can then be left to accumulate for many supertorrefaction cycles before they are removed by mixing the fouled supertorrefaction salt with the oxidizer salt that has Li/Na/K in the molar proportions 42.5/30.6/26.9, sparging with flue gas to turn everything into $Li_2CO_3/Na_2CO_3/K_2CO_3$, and piping a portion of the ternary carbonate salt into a vessel of liquid water to form a boiling hot aqueous solution of ternary alkali carbonate, from which the relatively insoluble $Li_2CO_3$ precipitates out. The solid $Li_2CO_3$ is then added back to the remaining portion of molten ternary carbonate to restore the molar proportions of $Li_2CO_3/Na_2CO_3/K_2CO_3$ to 42.5/30.6/26.9, while the $Na_2CO_3/K_2CO_3$ left in aqueous solution has the molar ratio 30.6/26.9. Enough purchased $HNO_3$ is then added to convert a fraction of the $Li_2CO_3/Na_2CO_3/K_2CO_3$ into the amount of $LiNO_3/NaNO_3/KNO_3$ desired for the molten oxidizer salt; whereas enough purchased HOAc is added to the $Na_2CO_3/K_2CO_3$ to make it an aqueous solution of NaOAc/KOAc with molar ratio 30.6/26.9. Boiling off the water then recovers the supertorrefaction salt as molten NaOAc/KOAc with the original molar ratio 30.6/26.9.

In practice, because $Li_2CO_3$ is slightly soluble in boiling hot water, the supertorrefaction salt over time will acquire a small contamination of LiOAc (of order 1% of the NaOAc/KOAc), which is quite soluble in water and therefore will be lost slowly via the pores of the exiting washed charcoal from the supertorrefying unit 14. This loss of lithium salt has to be replaced, as does the sodium and potassium counterparts (which are typically <0.1% of the weight of the charcoal), via periodic replenishment of $Li_2CO_3$, $Na_2CO_3$, and $K_2CO_3$, which are the cheapest and most easily purchased of the alkali salts.

The NaOAc/KOAc that constitutes about 99% of the alkali salt that escapes into the environment is a relatively inexpensive and benign salt (used in the food industry to flavor "salt and vinegar" potato chips) that is highly water soluble and can be utilized as plant food by growing vegetation should it enter the soil.

Uncontrollable buildup of tar may occur in the molten salt. Tars are insoluble in molten salt and remain trapped in the CF particles and are removed by both metal and fiber filtration. Tars that are dissolved in the molten salt can be burned by sparging with air, as long as the molten salt itself can survive heating to, for example, 500° C. In other words, once the heater using external fuels has melted and heated the clean process salt to the desired operating conditions, the heat needed for supertorrefying biomass and evaporating water in the saltiest wash liquid can be obtained, directly or indirectly, by sparging the filtered molten salt with the hot flue gas resulting from burning the syngas from supertorrefaction. If we wish to burn tars or organic ions in the molten salt, the flue gas should hold extra oxygen.

Figure 8:
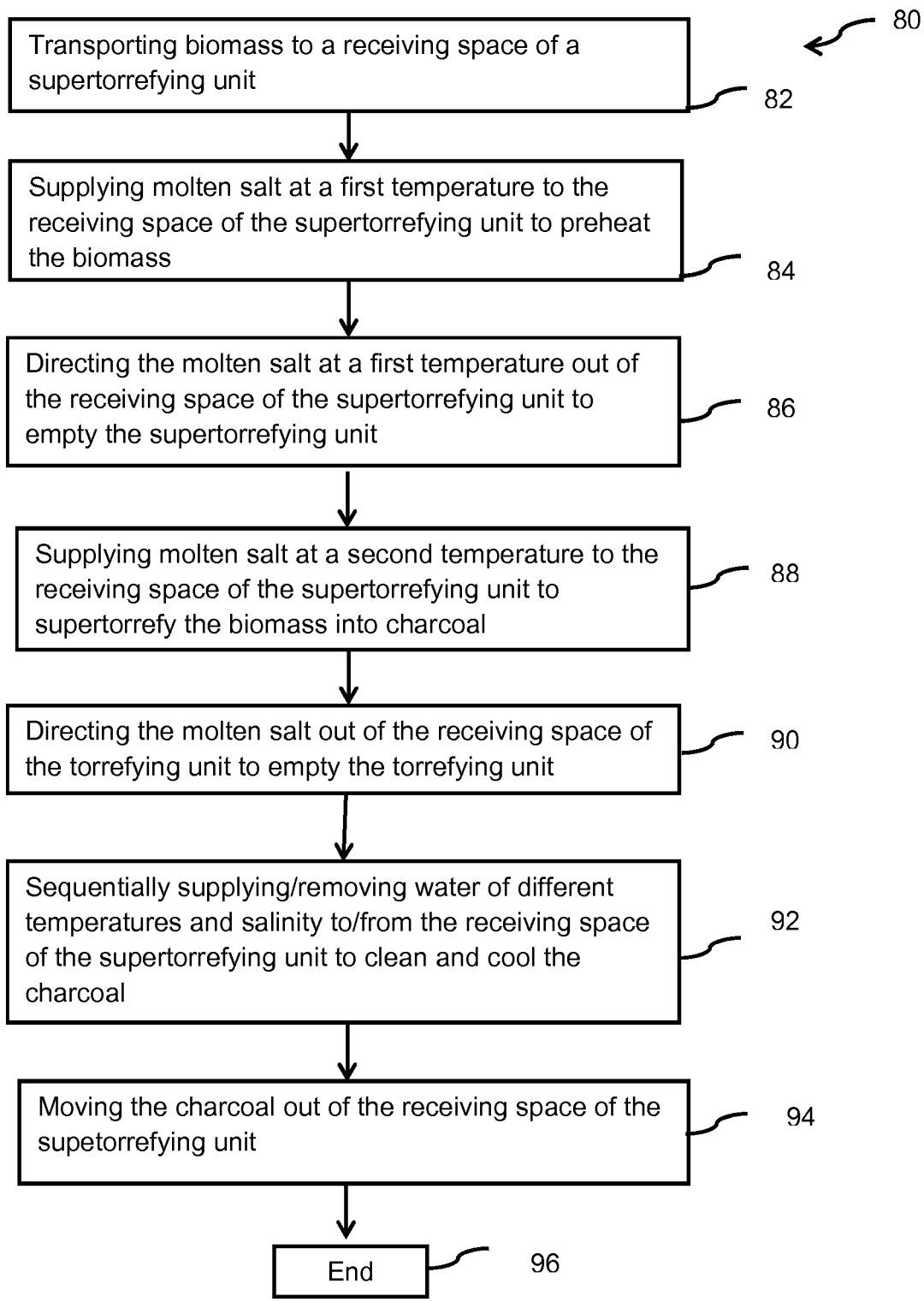
FIG. 8 is a flow diagram of a method for batch-processing biomass into charcoal in accordance with the principles of the present application.

Referring to FIG. 8, a method 80 of batch-processing the biomass into charcoal starts with a step of transporting the biomass, by the holding member, to a supertorrefying unit in step 82. Then, molten salt or their aqueous counterparts in a temperature range between 100° C. and 200° C. is supplied to the supertorrefying unit 14 to pre-heat and pre-dry the original biomass into dehydrated biomass in the supertorrefying unit 14 in step 84. Next, the molten salt at a first temperature is pumped out of the receiving space of the supertorrefying unit 14 in step 86, followed by supply molten salt at a second temperature range between 300° C. and 500° C. into the supertorrefying unit 14 to supertorrefy the dehydrated biomass into charcoal in the same supertorrefying unit 14 in step 88.

After the biomass is converted into the charcoal, the molten salt is pumped out of the receiving space of the supertorrefying unit 14 to empty the supertorrefying unit 14 in step 90. Next, aqueous liquids of decreasing temperature and salinity are sequentially supplied into the supertorrefying unit 14 to wash, clean, rinse, and cool the charcoal in step 92. The water is sequentially supplied from the plurality of basins to wash the charcoal and dissolve salt. The water can later be evaporated to recover the salt for further uses. The charcoal that has been cleaned in the supertorrefying unit is lifted out of the supertorrefying unit 14 and transported to the charcoal collection area. After the last basin supplies the water having the lowest temperature and least salinity to the supertorrefying unit 14, the charcoal has been cleaned without salt residue and has been cooled to near ambient temperature. The charcoal is moved out of the receiving space of the supertorrefying unit 14 in step 94. The method ends in step 96.

Optionally, during the pre-drying and supertorrefaction processes, volatile organic compounds (VOCs) may be generated and vented out through one or more gas ports, e.g., located below the cover of the supertorrefying unit 14. Therefore, when the supertorrefaction system 10 is used in area where water is scarce, these vapors may be collected and condensed for their water content, with or without specific scrubbing to remove the acid content from the vapors. Without specific scrubbing, the vapors can be condensed to generate a liquid called "bioliquor," including water, acetic acid, methanol, furfural, and acetol (also called hydroxyacetone). The incondensables or permanent gases (at standard temperature and pressure) contained in the vapors is called "syngas" and typically include carbon dioxide, carbon monoxide, methane, and hydrogen. The bioliquor can be collected for other economic uses, whereas the syngas can be either burned on site to provide supplemental heating to the supertorrefaction system 10 or can be collected for future use as a chemical feedstock.

The method may include optional steps of filtering CP particles from the molten salt between the supertorrefying unit 14 and the liquid tank 16 and filtering CP particles from the water between the wash tank 20 and the supertorrefying unit 14.

In the batch process supertorrefaction system 10 of the present application, the liquids at different temperatures and/or with different salinity levels are successively pumped into the supertorrefying unit 14 for contacting the biombass or biocoal for different purposes. First, molten salt of a first temperature is pumped into the supertorrefying unit 14 to pre-heat the biomass to reduce the water content in the biomass. Next, molten salt of a second temperature higher than the first temperature is pumped into the supertorrefying unit 14 to convert the biomass into biocoal. Thereafter, water with decreasing temperature and salinity is pumped into the supertorrefying unit to the supertorrefying unit 14 to rinse and cool the biocoal.

In the present method, the biomass to be heated and converted and the biocoal to be rinsed and cooled are contained in the stationary supertorrefying unit 14 without moving during the entire torrefaction process, as opposed to conventional torrefaction system/process where the biomass or biocoal is continuously moved from one liquid to another, either for heating or for cooling. In the present application, liquids of different temperatures and salinity levels are supplied from separate and different sources into the same supertorrefying unit 14. Pre-heating the biomass to reduce water content, supertorrefying the biomass into charcoal, and washing and cooling the charcoal all occur in one single container, i.e., the supertorrefying unit.

The stationary supertorrefying unit 14 makes collection of VOCs easier, by simply forming ports in the stationary supertorrefying unit 14 and guiding the VOC through the ports to a desired container, where the VOC can be further condensed to separate bioliquor from the syngas. Moreover, the supertorrefaction system 10 includes individual units, such as the supertorrefying unit, the heating unit, the condenser, the syngas burner, the scrubber, the CF/tar oxidizer, which are connected by removable pipes. Therefore, the supertorrefaction system 10 can be readily disassembled, transported to a different location, and reassembled adjacent to the source of the biomass.

The supertorrefaction system 10 further includes a VOC unit 22 including a condenser that collects and separates condensable volatile organic compounds from the incondensable gases. A scrubber 28 may be provided to chemically captures acetic acid as an acetate salt for conversion to a carbonate salt. A CF/tar oxidizer 50 may be sparged with a mixture of hot flue gas and air to destroy the charcoal fines containing tars that are filtered out from the salt used in the supertorrefying unit 14. The heat generated from the CF/tar oxidizer 50 may beneficially provide supplemental heating for the supertorrefaction process, for evaporating water in the first basin 60 to recover salt, or converting acetate salt to carbonate salt and acetone in the VOC unit 22.

The broad teachings of the disclosure can be implemented in a variety of forms, including pretreating the biomass with strong mineral acids, such as phosphoric acid ($H_3PO_4$), to produce activated carbon instead of ecocoal or biochar. The phosphate ions from $H_3PO_4$ eventually end up after reaction with the biomass and the alkali acetates as phosphate salts. When the acetate salts are turned into carbonate salts in the CF/tar oxidizer, the contaminant phosphate salts are not soluble in carbonate salts and precipitate out as solids. Thus, the phosphoric acid used for impregnation can be recycled ultimately as a valuable source of phosphate fertilizer.

By impregnating palm kernel shell (PKS) with molten phosphoric acid at 150 C for 3 hours before supertorrefying the impregnated PKS in NaOAc/KOAc at 400° C. for three hours, we have produced activated carbon with Brunauer-Emmett-Teller (BET) specific areas as high as 2088 $m^2/g$. Shorter impregnation times and shorter supertorrefaction residence times produce activated carbon with lower BET values, but still high enough to use for water filtration. (The standard by the American Water Works Association for this purpose is 650 $m^2/g$ to 1000 $m^2/g$.) Post-coating of activated carbon with various sorbents is an option, a known prior art for the specialized capture of various gaseous and liquid chemical compounds.

As previously noted, it is possible to substitute aqueous solutions for molten salts as the scrubbing fluid in scrubber 28. These substitutions require water evaporation before the conversion of acetate to carbonate with the release of acetone can take place, but the aqueous substitutes operated at lower temperatures can be less corrosive for the scrubbing equipment.

The supertorrefaction system 10 of the present application includes a plurality of discrete units, such as the transporting apparatus 12, the supertorrefying unit 14, the liquid tank 16, the heating unit 18, and the wash tank 20 that can be relatively easily assembled and disassemblied by using pipes to connect or disconnect them, thereby forming a compact and transportable supertorrefaction system.

In the supertorrefaction system of the present application, the molten salts can generate large heat capacity per unit volume at atmospheric pressure, thereby providing sufficient heat to the transportable, compact supertorrefaction of the present application. The supertorrefaciton system of the present application also captures valuable liquid and gaseous by-products generated during the supertorrefaction process for other uses.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A supertorrefaction system comprising:
    at least one supertorrefying unit defining a receiving space for receiving biomass;
    a liquid tank in fluid communication with the at least one supertorrefying unit and containing a first heat transfer liquid;
    a wash tank in fluid communication with the at least one supertorrefying unit and containing a second heat transfer liquid;
    a first filtration apparatus provided between the at least one supertorrefying unit and the liquid tank;
    a second filtration apparatus provided between the at least one supertorrefying unit and the wash tank; and
    an oxidizer comprising carbonate salt and nitrate salt as catalyst;
    wherein the at least one supertorrefying unit receives the first heat transfer liquid from the liquid tank to supertorrefy and convert the biomass into charcoal, and receives the second heat transfer liquid from the wash tank to rinse and cool the charcoal without moving the biomass and the charcoal during supertorrefaction and cooling processes;
    wherein the wash tank includes a plurality of basins containing the second heat transfer liquid having different temperatures and salinity, and
    wherein the first heat transfer liquid is molten salt.

2. The supertorrefaction system according to claim 1, further comprising a holding member for carrying and moving the biomass to the receiving space and for carrying and moving the charcoal out of the receiving space.

3. The supertorrefaction system according to claim 1, wherein the second heat transfer liquid is water.

4. The supertorrefaction system according to claim 2, wherein the holding member includes a meshed basket.

5. The supertorrefaction system according to claim 2, wherein the first heat transfer liquid is in direct contact with the biomass carried by the holding member and the second heat transfer liquid is in direct contact with the charcoal carried by the holding member, when the holding member is placed in the receiving space and when the first and second heat transfer liquids are supplied to the receiving space of the at least one supertorrefying unit at different time.

6. The supertorrefaction system according to claim 1, further comprising a filtration apparatus disposed between the at least one supertorrefying unit and at least one of the liquid tank and the wash tank.

7. The supertorrefaction system according to claim 1, further comprising a volatile organic compound (VOC) unit in fluid communication with the at least one supertorrefying unit for collecting VOCs.

8. The supertorrefaction system according to claim 7, wherein the VOC unit includes a scrubber containing carbonate salt to remove acetic acid from the VOCs.

9. The supertorrefaction system according to claim 8, wherein the VOC unit further includes a condenser for separating condensable VOCs as a bioliquor from incondensable gases.

10. The supertorrefaction system according to claim 1, wherein the first heat transfer liquid includes LiOAc, NaOAc, KOAc in various singlet, binary, or ternary combinations.

11. A method of batch-processing biomass into charcoal, comprising:
   providing biomass in a receiving space of at least one supertorrefying unit;
   supplying a first heat transfer liquid to the supertorrefying unit to supertorrefy and converting the biomass into charcoal;
   sequentially supplying a second heat transfer liquid having different temperatures and different salinity to the at least one supertorrefying unit to cool the charcoal;
   removing charcoal fines particles from the first heat transfer liquid by a first filtration apparatus;
   removing charcoal fines particles from the second heat transfer liquid by a second filtration apparatus; and
   treating the first heat transfer liquid tainted by charcoal fines particles generated during a supertorrefaction process by an oxidizer in the at least one supertorrefying unit; wherein said oxidizer comprises carbonate salt and nitrate salt as catalyst;
   wherein the biomass is not moved in the at least one supertorrefying unit during supertorrefaction of the biomass and the charcoal is not moved in the at least one supertorrefying unit during cooling of the charcoal;
   wherein the first heat transfer liquid is molten salt.

12. The method according to claim 11, further comprising preheating and supertorrefying the biomass in the receiving space of the supertorrefying unit and cooling the charcoal in the same receiving space of the supertorrefying unit.

13. The method according to claim 11, wherein the second heat transfer liquid is water.

14. The method according to claim 11, further comprising supplying the first heat transfer liquids to preheat and supertorrefy the biomass in the supertorrefying unit.

15. The method according to claim 11, further comprising transporting the biomass into the supertorrefying unit before the first heat transfer liquid is supplied to the supertorrefying unit.

16. The method according to claim 15, further comprising causing the first heat transfer liquid to be in direct contact with the biomass in the supertorrefying unit and causing the second heat transfer liquid to be in direct contact with the charcoal.

17. The method according to claim 16, further comprising changing at least one of operating temperature, residence time, and pretreatment impregnation of the biomass to generate different types of charcoal.

* * * * *